Figure 1:
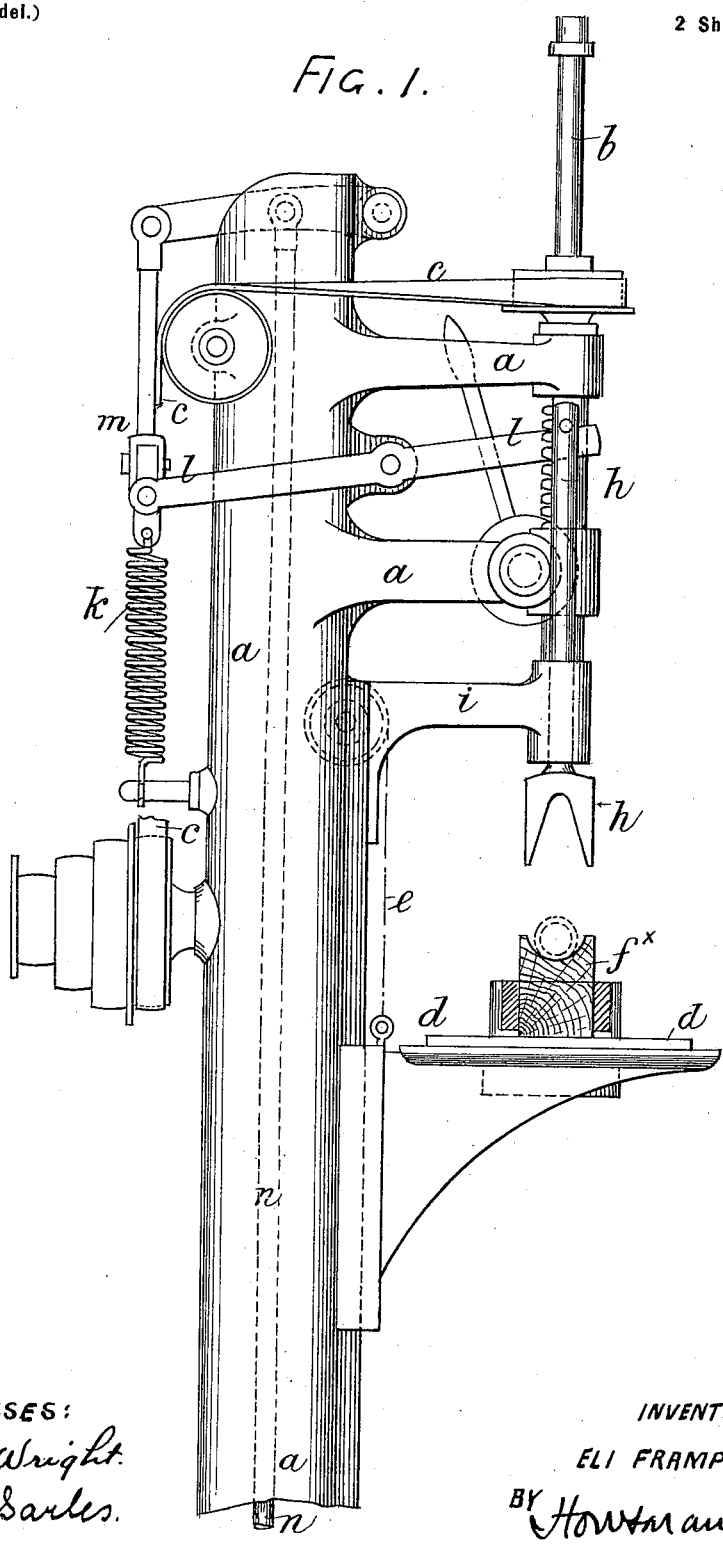

No. 627,916. Patented June 27, 1899.
E. FRAMPTON.
APPARATUS FOR FORMING CURVED MORTISES IN ENDS OF BAMBOOS OR OTHER ROUND RODS.
(Application filed Apr. 25, 1899.)
(No Model.) 2 Sheets—Sheet 1.

WITNESSES:
F. W. Wright
E. C. Sarles.

INVENTOR
ELI FRAMPTON
BY Howson and Howson
HIS ATTORNEYS.

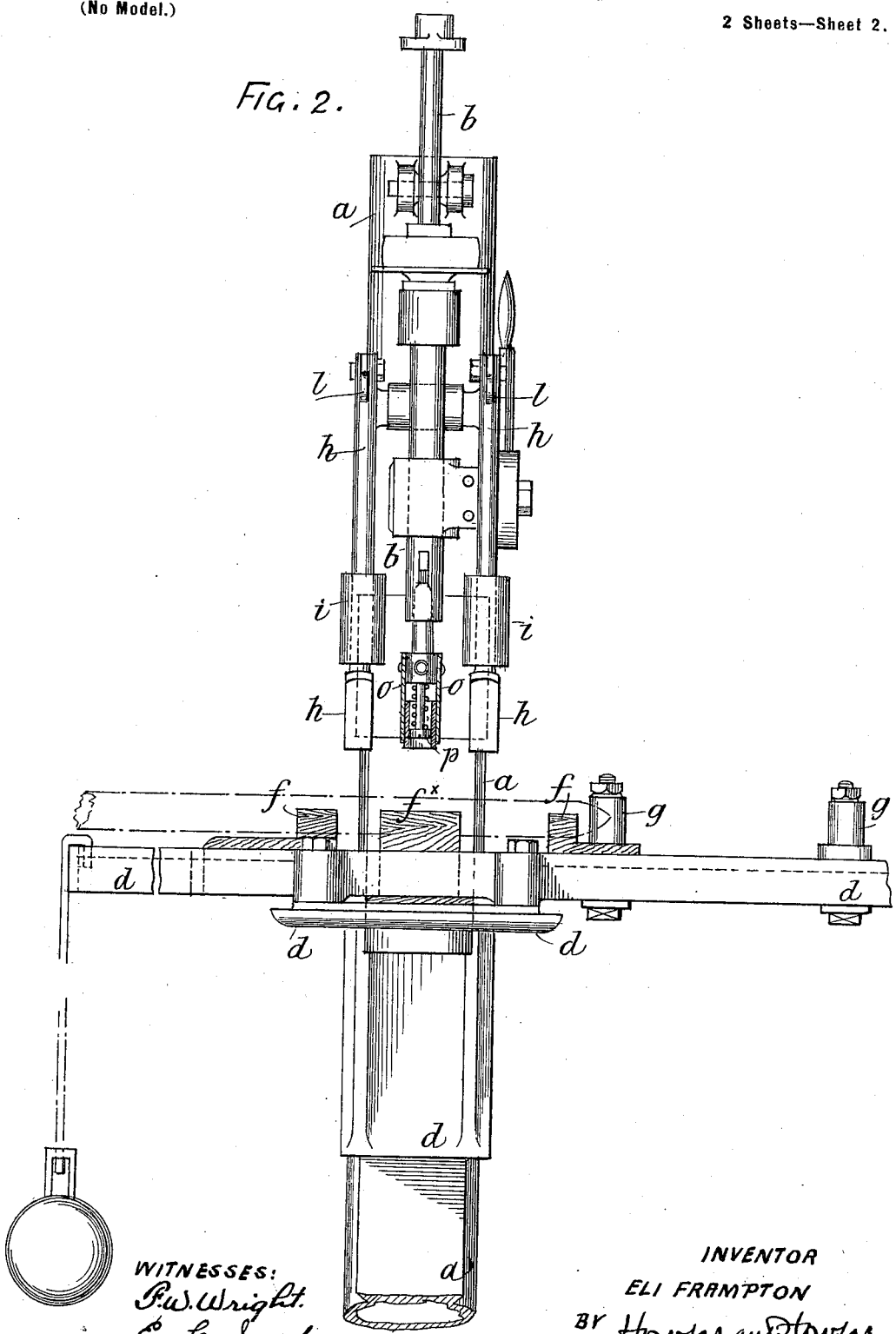

UNITED STATES PATENT OFFICE.

ELI FRAMPTON, OF MANCHESTER, ENGLAND.

APPARATUS FOR FORMING CURVED MORTISES IN ENDS OF BAMBOOS OR OTHER ROUND RODS.

SPECIFICATION forming part of Letters Patent No. 627,916, dated June 27, 1899.

Application filed April 25, 1899. Serial No. 714,454. (No model.)

*To all whom it may concern:*

Be it known that I, ELI FRAMPTON, a subject of the Queen of Great Britain, residing at Manchester, in the county of Lancaster, England, have invented new and useful Improved Apparatus for Forming Curved Mortises in the Ends of Bamboos or other Round Rods, of which the following is a specification.

This invention relates to means or apparatus for mortising the ends of bamboo or similar tubular or other round rods in order to make a framework or similar structure, the invention being designed principally to facilitate the manufacture of bamboo furniture.

The manner in which my said invention is to be performed or carried into practical effect will be readily understood on reference to the sheet of drawings hereunto annexed and the following explanation thereof.

Figure 1 on the drawings is a side elevation, and Fig. 2 a front view, of my improved apparatus applied to a vertical drilling-machine.

The invention consists, mainly, in the application to an ordinary vertical drilling-machine of a clamping device which holds the bamboo or rod in a V or other shaped groove in a block or table beneath the tool, which is such as to sever a desired length from a rod or cane having its end curved to correspond with the circumference of the rod or bamboo to which the said length is to be fitted. I can thus make mortises at each end of the bamboo or rod perfectly true and parallel, and I also can make a mortise at one end of two lengths at the same operation.

$a$ is the framing or standard, carrying the spindle $b$, which is driven by the endless strap $c$ in the ordinary manner.

$d$ is the adjustable work-table, which is suspended by a chain $e$, to the other end of which is attached a counterbalance-weight inside the standard $a$.

The table $d$ is provided with three notched supports $f$ for carrying the rod or bamboo, the central one, $f^x$, of which is a block of wood, through which there is a vertical hole corresponding with the diameter of the tool, so as to allow the latter to pass completely through the rod or bamboo, which is shown dotted in position to be operated upon. The table $d$ is also provided with an adjustable stop or stops $g$, against which the end of the cane or rod is held to determine the length of the part severed by the drilling or mortising tool. This stop or fence is preferably round or curved to fit the end of the rod or cane if it should be (as it usually is) already mortised.

The clamping device consists, preferably, of a pair of vertical rods or bars $h$ so formed at the base (see Fig. 1) as to grip the rod or cane. The said rods or bars $h$ are carried by and capable of sliding vertically in suitable bearings $i$, fixed to each side of the standard $a$, and are held up out of action by a coiled spring $k$, (or other suitable device,) attached to levers $l$, which act on the said clamping rods or bars $h$. A swing-bar or saddle $m$ (see Fig. 1) may connect these levers $l$, so as to allow the clamps to accommodate themselves to different thicknesses or unevenness of the bamboo—say, for example, that one clamp should come over a ring or other projection on the bamboo or cane. This would not be necessary when treating rods or canes which are of the same diameter from end to end.

The clamping-rods $h$ may be drawn down by a hand-lever; but I prefer to use a treadle attached to the lower end of the rod $n$. (See Fig. 1.)

The drilling or mortising tool which I prefer to use is made of a steel cylinder $o$, (see Fig. 2,) which is notched like a saw at the lower edge. Inside this cylinder $o$ is a spring-piston $p$, which as the cutter $o$ descends recedes into the cylinder, compressing the coiled spring until the tool has cut quite through the rod or cane, when the reaction of the said spring will push the plug or button out, thus leaving the cutter free for the next operation.

I may here observe that although I have described and shown my invention as applied to a vertical drilling-machine it will be evident that it may also be arranged to work in the horizontal position, if desired; but I consider the vertical arrangement of the apparatus preferable.

I claim as my invention—

1. A machine for mortising bamboo or the like, consisting of a frame, two sliding clamps therein and an adjustable rotary cutter between the clamps, in combination with a table having shaped supports for the bamboo to coöperate with the said clamps and cutter.

2. A machine for mortising bamboo or the like, consisting of a frame having bearings, sliding rods in said bearings and provided with clamps and a rotary cutter between the said clamps, in combination with a table having three supports, one under the cutter, substantially as described.

3. A machine for mortising bamboo or the like, consisting of a frame having bearings, two sliding clamps therein and means for moving the said clamps and their bearings, in combination with an adjustable rotary cutter between the two clamps and the table having supports for the bamboo to coöperate with the clamps and cutter.

In testimony whereof I have signed my name to this specification in the presence of two subscribing witnesses.

ELI FRAMPTON.

Witnesses:
 JNO. HUGHES,
 J. ERNEST HUGHES.